(12) United States Patent
Alali

(10) Patent No.: US 12,280,479 B1
(45) Date of Patent: Apr. 22, 2025

(54) TOOL FOR TORQUING GUIDANCE OF END FLANGE MATING SURFACES AND RELATED METHODS

(71) Applicant: KUWAIT NATIONAL PETROLEUM COMPANY, Safat (KW)

(72) Inventor: Hasan Aymma Alali, Kuwait (KW)

(73) Assignee: KUWAIT NATIONAL PETROLEUM COMPANY, Safat (KW)

( * ) Notice: Subject to any disclaimer, the term of this patent is extended or adjusted under 35 U.S.C. 154(b) by 0 days.

(21) Appl. No.: 18/808,339

(22) Filed: Aug. 19, 2024

(51) Int. Cl.
*B25B 29/00* (2006.01)
*G01B 5/14* (2006.01)

(52) U.S. Cl.
CPC ............. *B25B 29/00* (2013.01); *G01B 5/14* (2013.01)

(58) Field of Classification Search
CPC ........ F16L 19/0206; F16L 19/04; B25B 1/20; B25B 5/147; B25B 23/1427; B25B 23/1422; B25B 23/15; B23K 37/0533; G01B 3/10; G01B 5/063; G01B 5/14; G01B 5/143; G01B 5/16; G01B 5/24; Y10T 29/53678; Y10T 29/53683; Y10T 29/53796; Y10T 29/53861; Y10T 29/53865; Y10T 29/53891; Y10T 29/53913; Y10T 29/53917
See application file for complete search history.

(56) References Cited

U.S. PATENT DOCUMENTS

| | | | | |
|---|---|---|---|---|
| 422,104 A | * | 2/1890 | Burnett | G01B 5/14 172/1 |
| 1,588,101 A | * | 6/1926 | Roy | G01B 5/14 33/656 |
| 2,693,033 A | * | 11/1954 | Acker, Jr. | G01B 5/143 33/520 |
| 3,666,159 A | | 5/1972 | Watson | |
| 3,952,936 A | | 4/1976 | Dearman | |
| 5,094,435 A | | 3/1992 | Depperman et al. | |
| 2022/0018378 A1 | | 1/2022 | Richardson et al. | |

FOREIGN PATENT DOCUMENTS

| | | |
|---|---|---|
| CN | 115937106 A | 4/2023 |
| CN | 116928185 A | 10/2023 |
| GB | 2613569 A8 | 7/2023 |
| JP | 2023100423 A | 7/2023 |
| KR | 101924967 B1 | 2/2019 |

* cited by examiner

*Primary Examiner* — Tyrone V Hall, Jr.
(74) *Attorney, Agent, or Firm* — Nath, Goldberg & Meyer; Joshua B. Goldberg

(57) ABSTRACT

A tool for torquing guidance of mating surfaces and related methods are disclosed. The tool includes a plurality of arms, each arm having a proximal end joined at a center pivot point, and a distal end comprising a pointer. The plurality of arms are equidistantly spaced apart radially and may be extendable. The arms and pointers may be locked in an extended position by locking fasteners. Number markings are placed on each arm to indicate a torquing sequence order for proper torquing of a set of fasteners. The tool may be rotated as needed to subsequent sets of fasteners which may be torqued and the process continued until all fasteners of a pair of mating flanges have been torqued and fastened. A percentage dial may indicate the amount of completion of the torquing sequence order. The torquing sequence order may be based on, for example, a quadrant pattern cross-sequence.

18 Claims, 3 Drawing Sheets

TOOL FOR TORQUING GUIDANCE OF END FLANGE MATING SURFACES AND RELATED METHODS

BACKGROUND

Field

The disclosure of the present patent application relates to fastening of mating surfaces, and particularly to a tool and method for aiding in proper torquing of a pair of mating surfaces.

Description of Related Art

The utilization of fasteners, such as nuts and bolts, is perhaps the most common method for joining mating surfaces, equipment, pipelines, etc. Typically, a number of fasteners positioned along a perimeter of the mating surfaces are used for joining the surfaces. The integrity of this connection method is mainly dependent on how the fasteners are torqued. "Torquing" a fastener refers to the process of tightening the fastener by applying a specific torque value amount through use of a torque wrench. Torque is a measure of the rotational force applied to a fastener, typically expressed in units of pound-feet (lb-ft) or Newton-meters (Nm). Not following the correct torquing procedure can result in weak joints, which could lead to catastrophic failures. Every fastened connection has a proper torquing sequence for proper sealing to avoid any leaks. Nevertheless, under many time-limited and high-stress environments, such as in the oil and gas industry, many workers fail to follow a proper torquing sequence. Particularly with large flanges, workers under stress will often resort to the bad practice of using a circular sequential pattern during torquing. This has resulted in lost time when rectifying the induced problems, and in some cases affected lives and assets adversely. A need exists for a guiding tool to ease the torquing of flanged mating surfaces in a proper sequence, regardless of the number of fasteners required.

SUMMARY

A tool and method for torquing guidance of mating surfaces is set forth in the present disclosure. The tool includes a plurality of arms, each of the plurality of arms having a proximal end joined at a center point, and a distal end comprising a pointer. The plurality of arms are equidistantly spaced apart radially and may be extendable. The plurality of arms may include locking fasteners for locking the plurality of arms in an extended position. A central pivot member is included, wherein the plurality of arms are rotatable about the central pivot member. The central pivot member may extend orthogonally from a back side of the center point. A plurality of number markings are included in which a number is positioned on a respective arm of the plurality of arms and wherein the plurality of number markings are arranged and numbered to indicate a torquing sequence order. A percentage display may be included for displaying a numerical value indicating an amount of completion of the torquing sequence order. The torquing sequence order may be, for example, based on the ASME Quadrant Pattern Cross sequence.

The tool for torquing guidance of mating surfaces may include pointers that are extendable from the plurality of arms. Locking fasteners may be included for locking the pointers in an extended position. The plurality of arms may be arranged in a common plane. In a particular embodiment, the plurality of arms may comprise four arms oriented at right angles within the common plane. The central pivot member may extend in a depth-wise plane orthogonal to the common plane of the plurality of arms. The pointers may extend in a depth-wise plane orthogonal to the common plane of the plurality of arms. The plurality of arms may comprise a common central member forming the proximal ends of the plurality of arms and a plurality of extensions joined to the common central portion, the plurality of extensions forming the respective distal ends of the plurality of arms.

In addition, the present disclosure provides a method for torquing of mating surfaces. The method includes placing a tool for torquing guidance onto an outer face of a pair of mating flanges. The tool for torquing guidance includes a plurality of arms joined at a central pivot point and each arm of the plurality of arms having a number marking thereon. The number markings are arranged and numbered to indicate a torquing sequence order whereby a set of fasteners along a periphery of the mating flanges are tightened according to the torquing sequence order indicated by the number markings.

The method for torquing may further include pivoting the plurality of arms around the central pivot point to align with a subsequent set of fasteners along the periphery of the mating flanges, and tightening the subsequent set of fasteners according to the torquing sequence order indicated by the number markings and repeating steps of pivoting the plurality of arms to align with subsequent sets of fasteners and tightening the subsequent sets of fasteners according to the torquing sequence order, such as the ASME Quadrant Pattern Cross Sequence, indicated by the number markings until all fasteners of the mating flanges have been tightened.

The method may include extending the plurality of arms from the central pivot point to a location of the fasteners along the periphery of the mating flanges. Each arm of the plurality of arms may include a pointer which may be extended to indicate a fastener associated with a respective pointer and arm of the plurality of arms. The method may include displaying a numerical amount indicating a percentage of completion of the torquing sequence order of the mating surfaces.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
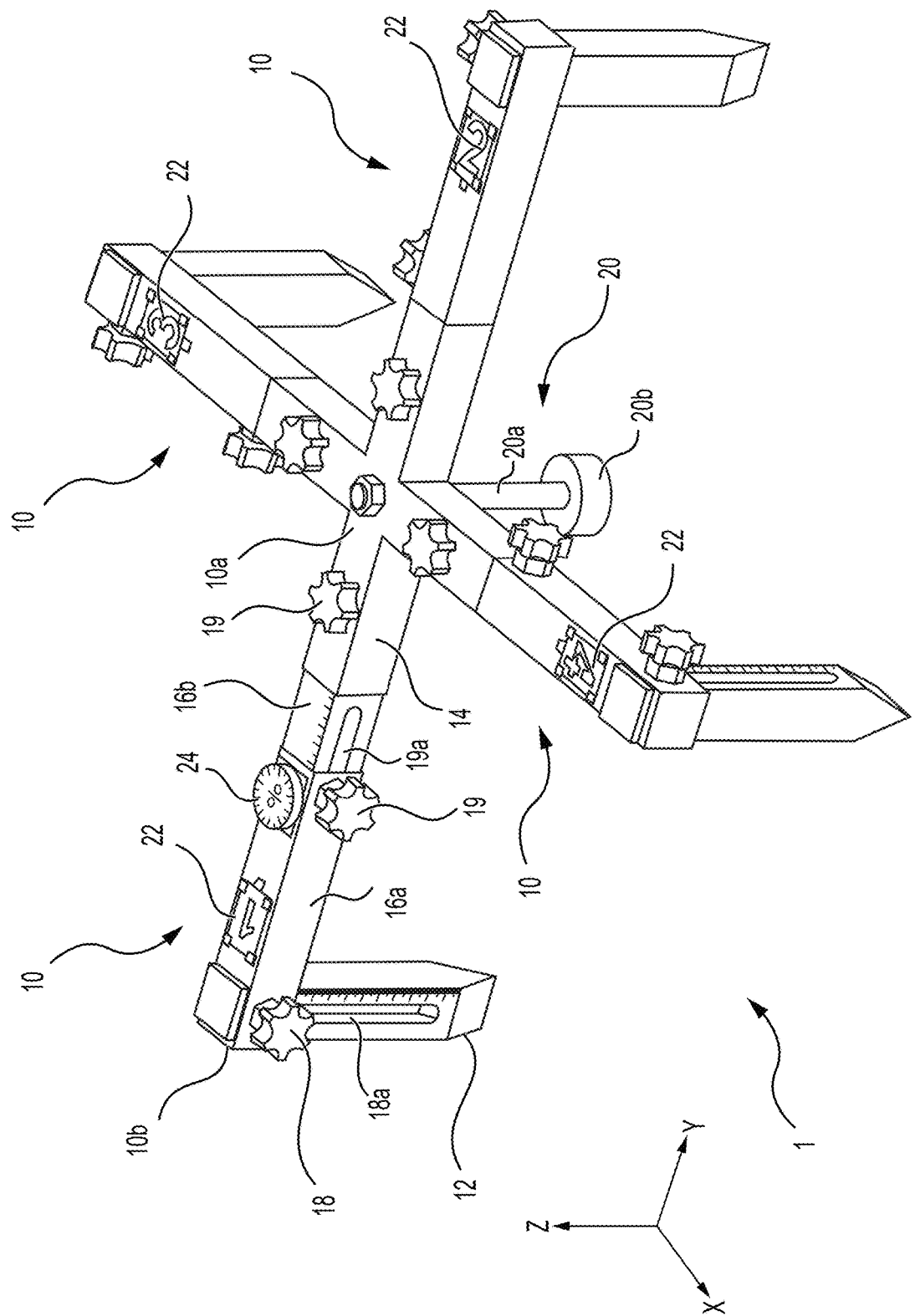
FIG. 1 is an overhead perspective view of a front side of a tool for torquing guidance.

A tool 1 for torquing guidance of mating surfaces is disclosed in FIG. 1. The tool 1 includes a plurality of arms 10, each of the plurality of arms 10 having a proximal end 10a joined at a center point, and a distal end 10b comprising a pointer 12. The plurality of arms 10 are equidistantly spaced apart radially. Or, in other words, the angle of separation between neighboring arms is the same for all the arms 10. For example, as shown in FIG. 1, the arms may be arranged at 90° from each other in a common horizontal plane, or X-Y plane. While FIG. 1 shows four arms at right angles to each other, this is for illustrative purposes only and any number of arms may be used at equidistant angles (e.g., three arms at) 120° within the scope of the present subject matter. Pointers 12 may be formed on the distal ends 10b in the same plane of each arm 10 or may be configured to extend, as shown, in a depth-wise plane, or Z-axis plane, orthogonally downward from the common plane of the arms 10. Pointers 12 may include markings indicating a length of extension and may be configured to be fixed in place through the use of fasteners 18 inserted into slots 18a or holes (not shown) such that the pointers 12 may be fixed in different positions along their length.

Arms 10 are configured to be extended in, for example, a telescoping or other suitable manner, and may be comprised of single unitary arms or multiple sections such as a central section 14 and distal sections 16a, 16b. Central section 14 makes up the proximal ends 10a of the arms 10, while distal section 16a forms the distal ends 10b of the arms 10. Distal section 16b may include markings indicating a total radial length and/or a length of extension of the arms 10. The plurality of arms 10 may include locking fasteners 19 configured to lock the arms 10 in an extended position. Fasteners 19 may be joined to arms 10 by slots 19a or holes (not shown) allowing for adjustment in various positions along the length of the arms 10.

A central pivot member 20 is included, whereby the plurality of arms 10 are rotatable about the central pivot member 20. The central pivot member 20 forms a center point of tool 1 and may extend orthogonally downward in a depth-wise or Z-axis plane from a back side of central section 14. While central pivot member 20 may be pivotable by any suitable means, such as through bearings, a straightforward arrangement may be provided as shown, which includes a central telescopically adjustable shaft 20a and a base member 20b. As shown in the non-limiting embodiment of FIG. 1, shaft 20a is vertically adjustable as well as freely rotatable within base member 20b. It should be understood however, that other pivoting arrangements may be provided, such as a bearing on shaft 20a within central portion 14, for example.

A plurality of number markings 22 are included in which a unique number, shown in this case as numbers One to Four, is positioned on a respective arm of the plurality of arms 10 and wherein the plurality of number markings 22 are arranged and numbered to indicate a torquing sequence order, in this case a cross-wise pattern. The unique number will be reflective of the number of arms utilized with the tool 1. In FIG. 1, the numbers One to Four are used because the non-limiting embodiment shows four arms. If the tool only had three arms, then the number markings 22 would be One to Three. For the sake of clarity, as used herein, the phrase "torquing sequence order" is used to indicate a sequence used for torquing a set of fasteners. More will be explained on this aspect in the paragraphs below.

A percentage display 24 may be included for displaying a numerical value indicating an amount of completion of the torquing sequence order. Percentage display 24 is shown as a rotary dial with pointer indicator but may include other numerical displays such as a digital display with buttons, a rotary dial with window indicator, a linear display with sliding pointer, or other suitable means for displaying a percentage or fraction amount.

Method of Use

Figure 2A:
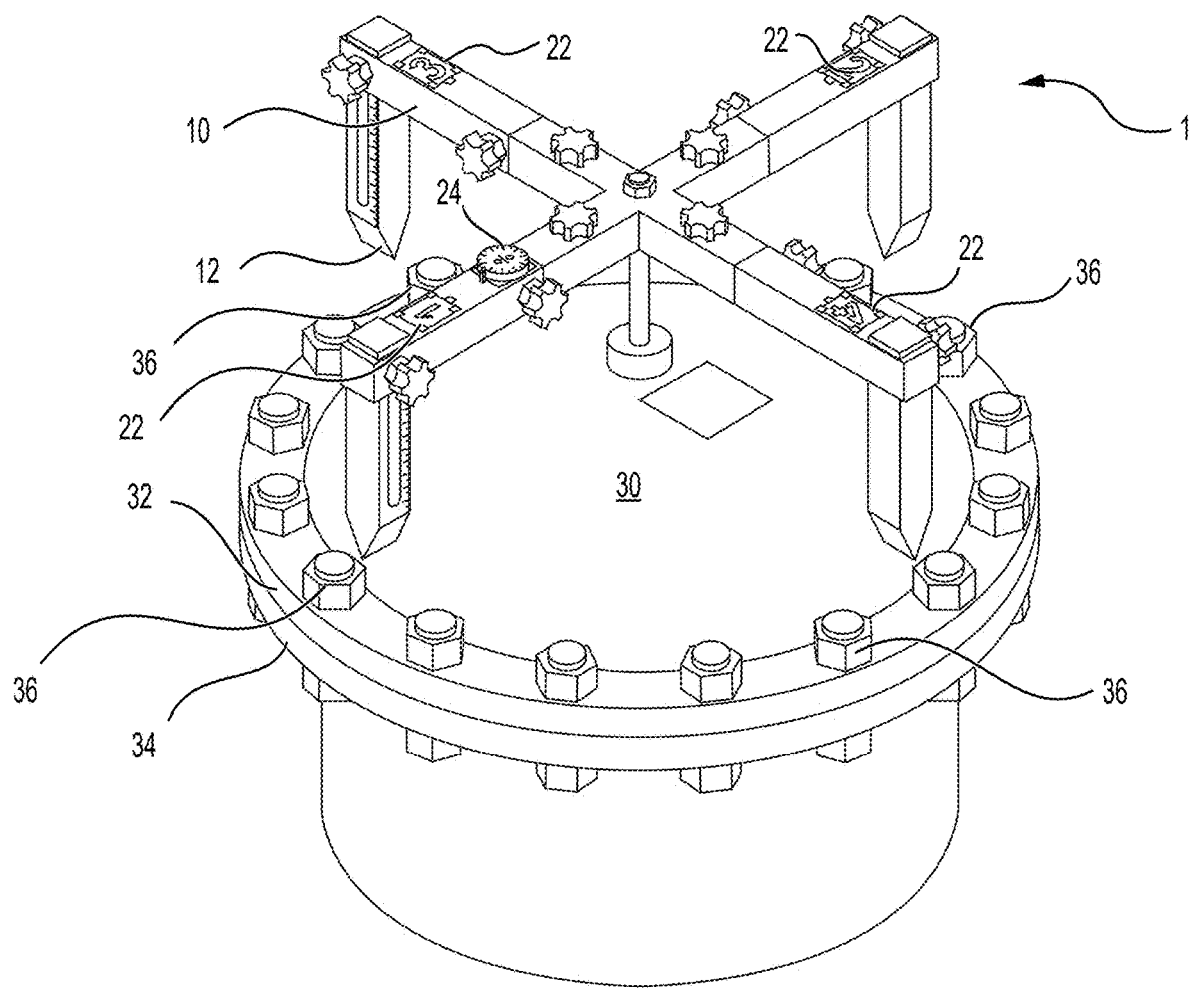
FIG. 2A is an environmental perspective view of a tool for torquing guidance in use on a pair of mating flanges.

In addition to tool 1, the present disclosure provides a method for torquing of mating surfaces, which will be described with reference to FIGS. 2A and 2B. The method includes placing a tool 1 for torquing guidance onto an outer face 30 of a pair of mating flanges 32, 34. The tool for torquing guidance includes a plurality of arms 10 joined at a central pivot point and each arm of the plurality of arms having a number marking 22 thereon. The number markings 22 are arranged and numbered to indicate a torquing sequence order whereby a set of fasteners 36 aligned with arms 10 and pointers 12 along a periphery of the mating flanges 32, 34 are tightened to their respective torque amounts according to the torquing sequence order indicated by the number markings 22. In the illustration shown, four numbers, numbered One to Four, are provided on four respective arms 10 in a cross-wise pattern, in which the fastener aligned with number One is tightened first, followed by tightening the fastener aligned with number Two and so on, until all four fasteners 36 making up a first set of fasteners are tightened to their proper torque amount, using for example a manual or pneumatic torque wrench.

It should be noted, for the purposes of this disclosure, the use of the words "tighten", "tightened", "fasten", and "fastened" are used to refer to their conventional meanings, but also may refer, as used herein, to the application of a predetermined torque amount to a fastener, through the use of a torque wrench. Likewise, the use of the words "torque" and "torqued" are used herein for their conventional meanings, which may include but is not limited to, the application of a specific torque amount to a fastener, similarly to "tighten", "tightened", "fasten" or "fastened" as used herein. The significance of applying set torque amounts to fasteners such as nuts and bolts is well known in the art and will not be discussed at great length here, but is determinate on factors such as the material and size of the fasteners used, the material of the components being joined, the intended load and stress of a particular joint, as well as any applicable industry standards or specifications.

Figure 2B:
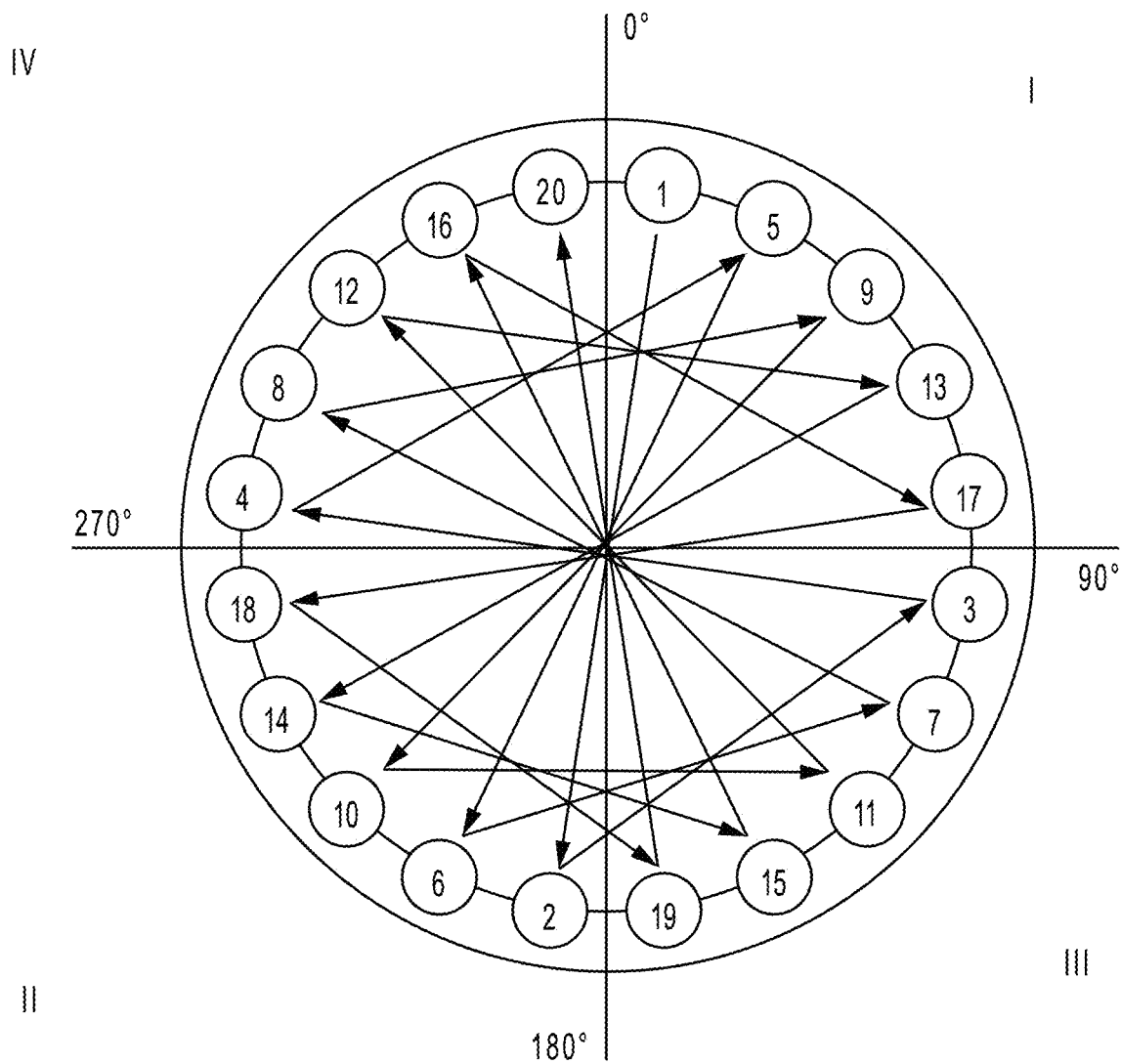
FIG. 2B is a pattern based on the ASME Quadrant Pattern Cross Sequence.

Continuing the discussion of the method for torquing disclosed herein, the torquing sequence order indicated by number markings 22 may be based on, for example, the ASME Quadrant Pattern Cross Sequence, in the manner illustrated in the example of FIG. 2B, which includes a total of twenty fasteners. Referring to both FIG. 2A and FIG. 2B, the method includes pivoting tool 1 and the plurality of arms 10 around the central pivot point to align with subsequent sets of fasteners 36 along the periphery of the mating flanges 32, 34, and tightening a subsequent set of fasteners 36 according to the torquing sequence order indicated by the number markings 22. Once the subsequent set of fasteners 36 have been tightened/torqued to their proper amount, arms 10 are rotated once more to align with a new set of fasteners, which are again tightened in the sequence indicated by number markings 22. The steps are repeated until all of the fasteners along the periphery of the flanges have been torqued to their proper amount, with no remaining fasteners needing to be tightened. It should be noted, that the use of the term "fastener" as used throughout the present disclosure refers to the conventional meaning of any of various devices used for fastening, as well as in a more particular sense to either the head of a bolt or a threaded nut placed on a bolt, as are commonly used on flanges of the type used in the oil and gas industry. With each pass in which a set of fasteners 36 have been tightened/torqued, the percentage display 24 may be used to indicate the percentage of the final torque target that has been completed after a full pass on all the fasteners. For example, to torque fasteners to 100 ft-lbs in even passes of 25 ft-lbs., after completing a second pass on all fasteners, the fasteners would be torqued to 50 ft-lbs and the percentage dial would be pointing at 50% completion. In another example, a technician may decide to torque in three passes where the percentage per pass are 30%, 60%, and 100% of the final torque target respectively. Hence, the percentage dial can be used to remind the technician of his/her progress after completing a full pass.

It is to be understood that the tool for correct sequence torquing of mating surfaces and methods disclosed herein are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A tool for torquing guidance of mating surfaces, comprising:
   a plurality of arms, each of the plurality of arms having a proximal end joined at a center point, and a distal end comprising a pointer; wherein the plurality of arms are equidistantly spaced apart radially about the center point;
   a central pivot member located at the center point, wherein the plurality of arms are rotatable about the central pivot member;
   a plurality of number markings, wherein each of the plurality of number markings is positioned on a respective arm of the plurality of arms and wherein the plurality of number markings are arranged and numbered on the plurality of arms to indicate a torquing sequence order for a plurality of fasteners; and
   a percentage display configured to display a numerical value indicating an amount of completion of the torquing sequence order.

2. The tool for torquing guidance of mating surfaces as recited in claim 1, wherein the central pivot member extends orthogonally from a back side of the center point.

3. The tool for torquing guidance of mating surfaces as recited in claim 1, wherein the plurality of arms are configured to be extended.

4. The tool for torquing guidance of mating surfaces as recited in claim 3, further comprising locking fasteners configured to lock the plurality of arms in an extended position.

5. The tool for torquing guidance of mating surfaces as recited in claim 1, wherein the percentage display comprises a rotary dial.

6. The tool for torquing guidance of mating surfaces as recited in claim 1, wherein the pointers are configured to extend from the plurality of arms.

7. The tool for torquing guidance of mating surfaces as recited in claim 6, wherein the pointers include locking fasteners configured to lock the pointers in an extended position.

8. The tool for torquing guidance of mating surfaces as recited in claim 1, wherein the plurality of arms are arranged in a common plane.

9. The tool for torquing guidance of mating surfaces as recited in claim 8, wherein the plurality of arms comprise four arms oriented at right angles from each other within the common plane.

10. The tool for torquing guidance of mating surfaces as recited in claim 8, wherein the central pivot member extends in a depth-wise plane orthogonal to the common plane of the plurality of arms.

11. The tool for torquing guidance of mating surfaces as recited in claim 8, wherein the pointers extend in a depth-wise plane orthogonal to the common plane of the plurality of arms.

12. The tool for torquing guidance of mating surfaces as recited in claim 1, wherein the plurality of arms comprise a common central member forming the proximal ends of the plurality of arms and a plurality of extensions joined to the common central member, the plurality of extensions forming the respective distal ends of the plurality of arms.

13. A method for torquing of mating surfaces, comprising:
   placing a tool for torquing guidance onto an outer face of a pair of mating flanges, wherein the tool for torquing guidance includes a plurality of arms joined at a central pivot point and each arm of the plurality of arms has a number marking thereon, wherein the number markings are arranged and numbered to indicate a torquing sequence order;
   tightening a set of fasteners along a periphery of the mating flanges according to the torquing sequence order indicated by the number markings.

14. The method for torquing of mating surfaces as recited in claim 13, further comprising:
   after tightening the set of fasteners along the periphery of the mating flanges, pivoting the plurality of arms around the central pivot point to align with a subsequent set of fasteners along the periphery of the mating flanges;
   tightening the subsequent set of fasteners according to the torquing sequence order indicated by the number markings; and
   repeating steps of pivoting the plurality of arms to align with subsequent sets of fasteners and tightening the subsequent sets of fasteners according to the torquing sequence order indicated by the number markings until all fasteners of the mating flanges have been tightened.

15. The method for torquing of mating surfaces as recited in claim 13, wherein the torquing sequence order is a quadrant pattern cross sequence.

16. The method for torquing of mating surfaces as recited in claim 13 further comprising: extending the plurality of arms from the central pivot point to a location of the fasteners along the periphery of the mating flanges, wherein each arm of the plurality of arms includes a pointer.

17. The method for torquing of mating surfaces as recited in claim 16 further comprising: aligning the pointers of the plurality of arms with a set of fasteners thereby associating a fastener with a respective pointer and arm of the plurality of arms.

18. The method for torquing of mating surfaces as recited in claim 13 further comprising: displaying a numerical amount indicating a percentage of completion of the torquing sequence order.

* * * * *